United States Patent [19]

Chang

[11] Patent Number: 5,086,025

[45] Date of Patent: *Feb. 4, 1992

[54] METHOD FOR PREPARING A SILICA GEL SUPPORTED METALLOCENE-ALUMOXANE CATALYST

[75] Inventor: Main Chang, Houston, Tex.

[73] Assignee: Exxon Chemical Patents Inc., Linden, N.J.

[*] Notice: The portion of the term of this patent subsequent to Feb. 28, 2006 has been disclaimed.

[21] Appl. No.: 567,489

[22] Filed: Aug. 14, 1990

Related U.S. Application Data

[62] Division of Ser. No. 174,668, Mar. 29, 1988, Pat. No. 5,008,228.

[51] Int. Cl.$^5$ ............... C08F 4/656; C08F 4; C08F 68
[52] U.S. Cl. .................. 502/117; 502/103; 502/111; 502/120; 526/129
[58] Field of Search ............ 502/103, 111, 117, 120

[56] References Cited

U.S. PATENT DOCUMENTS

| | | | |
|---|---|---|---|
| 4,808,561 | 2/1989 | Welborn | 502/120 X |
| 4,912,075 | 3/1990 | Chang | 502/111 X |
| 4,935,397 | 6/1990 | Chang | 502/117 |
| 4,937,217 | 6/1990 | Chang | 502/111 |

FOREIGN PATENT DOCUMENTS 170059 5/1986 European Pat. Off. ........... 502/120

*Primary Examiner*—Patrick P. Garvin
*Attorney, Agent, or Firm*—Jaimes Sher; Myron B. Kurtzman

[57] ABSTRACT

This invention relates to a process for preparing a supported metallocene alumoxane catalyst for use in the slurry or liquid phase polymerization of olefins. The invention particularly relates to the use of silica gel containing from about 10 to about 50 percent by weight adsorbed water as the catalyst support material. It has been found that such silica gel may be safely added to an aluminum trialkyl solution to form by direct reaction with the adsorbed water content of the silica gel catalyst support material the alumoxane component of the catalyst system. An alumoxane coated silica gel is formed to which a metallocene may be added. The resulting material can either be used in this slurry state for slurry polymerization or can be used for liquid phase polymerization of olefins.

10 Claims, No Drawings

METHOD FOR PREPARING A SILICA GEL SUPPORTED METALLOCENE-ALUMOXANE CATALYST

This is a division of application Ser. No. 174,668, filed Mar. 29, 1988, and now U.S. Pat. No. 5,008,228.

FIELD OF THE INVENTION

This invention relates to a process for preparing a supported metallocene alumoxane catalyst for use in the liquid or slurry phase polymerization of olefins. The invention particularly relates to the use of silica gel containing from about 10 to about 40 percent by weight adsorbed water as the catalyst support material. It has been found that such silica gel may be safely added to an aluminum trialkyl solution to form, by direct reaction with the adsorbed water content of the silica gel catalyst support material, the alumoxane component of the catalyst system.

BACKGROUND OF THE INVENTION

Olefin polymerization catalysts comprising a metallocene and an aluminum alkyl component were first proposed in about 1956. Australian patent 220436 proposed for use as a polymerization catalyst a bis-(cyclopentadienyl) titanium, zirconium, or vanadium salt as reacted with a variety of halogenated or unhalogenated aluminum alkyl compounds. Although such complexes were capable of catalyzing the polymerization of ethylene, such catalytic complexes, especially those made by reaction with an aluminum trialkyl, had an insufficient level of catalytic activity to be employed commercially for production of polyethylene or copolymers of ethylene.

Later it was found that certain metallocenes such as bis-(cyclopentadienyl) titanium, or zirconium dialkyls in combination with aluminum alkyl/water cocatalyst form catalyst systems for the polymerization of ethylene. Such catalysts are discussed in German Patent Application 2,608,863 which discloses a polymerization catalyst for ethylene consisting of bis-(cyclopentadienyl) titanium dialkyl, aluminum trialkyl and water. German Patent Application 2,608,933 discloses an ethylene polymerization catalyst consisting of a cyclopentadienyl zirconium salt, an aluminum trialkyl cocatalyst and water. European Patent Application No. 0035242 discloses a process for preparing ethylene and atactic propylene polymers in the presence of a halogen free cyclopentadienyl transition metal salt and an alumoxane. Such catalysts have sufficient activity to be commercially useful and enable the control of polyolefin molecular weight by means other than hydrogen addition—such as by controlling the reaction temperature or by controlling the amount of cocatalyst alumoxane as such or as produced by the reaction of water with an aluminum alkyl.

To realize the benefits of such catalyst systems, one must use or produce the required alumoxane cocatalyst component. An alumoxane is produced by the reaction of an aluminum alkyl with water. The reaction of an aluminum alkyl with water is very rapid and highly exothermic. Because of the extreme violence of the reaction, the alumoxane cocatalyst component has, heretofore, been separately prepared by one of two general methods. Alumoxanes may be prepared by adding an extremely finely divided water, such as in the form of a humid solvent, to a solution of aluminum alkyl in benzene or other aliphatic hydrocarbons. The production of an alumoxane by such procedures requires use of explosion-proof equipment and very close control of the reaction conditions in order to reduce potential fire and explosion hazards. For this reason, it has been preferred to produce alumoxane by reacting an aluminum alkyl with a hydrated salt, such as hydrated copper sulfate. In such procedure a slurry of finely divided copper sulfate pentahydrate and toluene is formed and mantled under an inert gas. Aluminum alkyl is then slowly added to the slurry with stirring and the reaction mixture is maintained at room temperature for 24 to 48 hours during which a slow hydrolysis occurs by which alumoxane is produced. Although the production of alumoxane by a hydrated salt method significantly reduces the explosion and fire hazard inherent in the wet solvent production method, production of an alumoxane by reaction with a hydrated salt must be carried out as a process separate from that of producing the metallocene alumoxane catalyst itself. This process is also slow and produces hazardous wastes that create disposal problems. Further, before the alumoxane can be used for the production of the active catalyst complex, the hydrated salt reagent must be separated from the alumoxane to prevent it from becoming entrained in the catalyst complex and thus contaminating any polymer produced therewith.

Only in those situations wherein a hydrated material is of a chemical composition acceptable as a filler material for a filled polyolefin composition may it be used to produce a metallocene/alumoxane catalyst complex by direct reaction with an aluminum alkyl solution. Hence U.S. Pat. No. 4,431,788 discloses a process for producing a starch filled polyolefin composition wherein an aluminum trialkyl is first reacted with starch particles of a moisture content below 7 weight percent. The starch particles are then treated with a (cyclopentadienyl)-chromium, titanium, vanadium or zirconium alkyl to form a metallocene alumoxane catalyst complex on the surface of the starch particles. An olefin is then polymerized about the starch particles by solution or suspension polymerization procedures to form a free-flowing composition of polyolefin-coated starch particles. German Patent 3,240,382 likewise discloses a method for producing a filled polyolefin composition which utilizes the water content of an inorganic filler material to directly react with an aluminum trialkyl and produce thereon an active metallocene alumoxane catalyst complex. Polymer is produced by solution or gas phase procedures at the filler surface to uniformly coat the filler particles and provide a filled polymer composition..

German Patent 3,240,382 notes that the activity of a metallocene alumoxane catalyst is greatly impaired or lost when prepared as a surface coating on an inorganic material. Although German Patent 3,240,382 suggests that an inorganic material containing absorbed or adsorbed water may be used as a filler material from which the alumoxane cocatalyst component may be prepared by direct reaction with an aluminum trialkyl, the only water containing inorganic filler materials which are identified as capable of producing the alumoxane without adversely affecting the activity of the metallocene alumoxane catalyst complex are certain inorganic materials containing water of crystallization or bound water, such as gypsum or mica. German Patent 3,240,382 does not illustrate the production of a catalyst coated inorganic filler material wherein the inorganic material is one having absorbed or adsorbed water. Nor does German Patent 3,240,382 describe an inorganic filler material having absorbed or adsorbed water which has surface area or pore volume properties suitable for service as a catalyst support for a liquid or slurry phase polymerization procedure.

European Patent 0,170,059 discloses a process for forming alumoxanes for catalysts in polymerization of olefins. Specifically, it discloses adding a finely divided porous solid, e.g., silica dioxide or aluminum oxide, to a non-aqueous medium, adding water to that medium and then mixing in aluminum trialkyl to form alumoxane. After the alumoxane is formed, a transition metal compound (metallocene) is added, followed by the monomer. Since water and porous solid are added separately into the reactor, this technique basically involves adding aluminum trialkyl to water which yields a catalyst not being attached to any solid support. The catalyst produced in this process can cause severe reactor fouling during the polymerization due to the nature of the unsupported catalyst.

It would be desirable to devise an economical, reproducible, and clean process whereby an active supported metallocene/alumoxane catalyst could be produced for use in liquid or slurry phase polymerization. To be economical the process should dispense with the requirement of producing the alumoxane component as a separate component apart from the procedure by which the catalyst itself is prepared. To be reproducible, the procedure should specify the exact procedure of producing the porous solid material which contains the right amount of water absorbed or adsorbed on its surface so that it could generate alumoxane with a high degree of catalytic activity. To be clean, the catalyst produced in the polymerization system should not cause the fouling of the reactor during the polymerization so that it could be applied to commercial production.

SUMMARY OF THE INVENTION

The process of this invention utilizes as the catalyst support material silica particles having a surface area in the range of about 10 m$^2$/g to about 700 m$^2$/g, preferably about 100-500 m$^2$/g and desirably about 200-400 m$^2$/g, a pore volume of about 3 to about 0.5 cc/g and preferably 2-1 cc/g and an adsorbed water content of from about 10 to about 50 weight percent, preferably from about 20 to about 40 weight percent, and most preferably about 35 weight percent. Such silica particles are referred to hereafter as a "water-impregnated" silica gel. The silica gel supported metallocene alumoxane catalyst is prepared by adding the water-impregnated silica gel to a stirred solution of aluminum trialkyl in an amount sufficient to provide a mole ratio of aluminum trialkyl to water of from about 10:1 to about 1:1, preferably 5:1 to about 1:1; thereafter adding to this stirred solution a metallocene in an amount sufficient to provide an aluminum to transitional metal ratio of from about 1000:1 to 1:1, preferably from about 300:1 to 10:1, most preferably from about 150:1 to about 30:1. The contact of the water-impregnated material with aluminum trialkyl forms an alumoxane compound attached to the surface of the support. The reaction between the supported alumoxane with metallocene compound produces a supported catalyst with high catalytic activity in a liquid medium. Of course, the silica gel can be contacted with the metallocene and alumoxane in any order or simultaneously, but the above-described order of addition is preferred. The supported catalyst greatly reduces the reactor fouling during the polymerization due to the formation of granular polymer particle.

The catalyst complex formed by this process can be used for polymerization of olefins by conventional liquid or slurry phase polymerization procedures. In both cases, aluminum trialkyl, water-impregnated silica, metallocene, comonomer, as well as ethylene feed can be added continuously into the reactor while polymer product is continuously removed from the reactor.

DETAILED DESCRIPTION OF THE PREFERRED EMBODIMENTS

The present invention is directed toward a method for preparing a supported catalyst system for use in the liquid or slurry phase polymerization of olefins, particularly lower alpha-olefins, such as ethylene, propylene, and butene-1, hexene-1 and octene-1. The catalyst is especially useful for the production of linear low density polyethylene (LLDPE). The polymers are intended for fabrication into articles by extrusion, injection molding, thermoforming, rotational molding, and the like. In particular, the polymers prepared with the catalyst complex and by the method of this invention are homopolymers or copolymers of ethylene with higher alpha-olefins having up to about 10 carbon atoms. Illustrative of the higher alpha-olefins are hexene-1 and octene-1.

In the process of the present invention, ethylene, either alone or together with alpha-olefins having up to about 10 carbon atoms, is polymerized in the presence of a silica gel supported catalyst system comprising at least one metallocene and an alumoxane. In accordance with this invention, olefin copolymers, particularly copolymers of ethylene and higher alpha-olefins having from 3-10 carbon atoms, can also be produced.

The active catalyst complex prepared by the process of this invention comprises a metallocene and an alumoxane adsorbed onto the surface of a silica gel support material. Alumoxanes are oligomeric aluminum compounds represented by the general formula $(R-Al-O)_y$ which is believed to be a cyclic compound and $R(R-Al-O)_yAlR_2$, which is a linear compound. In the general formula, "R" is a $C_1-C_{10}$ alkyl group such as, for example, methyl, ethyl, propyl, butyl, and pentyl and "y" is an integer from 2 to about 30 and represents the degree of oligomerization of the alumoxane. Preferably, "R" is methyl and "y" is about 4 to about 25 and most preferably 6-25. Generally, in the preparation of alumoxanes from, for example, the reaction of aluminum trimethyl and water, a mixture of linear and cyclic compounds is obtained. Generally, an alumoxane having a higher degree of oligomerization will, for a given metallocene, produce a catalyst complex of higher activity than will an alumoxane having a lower degree of oligomerization. Hence, the procedure by which alumoxane is produced by direct reaction of an aluminum trialkyl with a water-impregnated silica gel should ensure the conversion of the bulk quantity of the aluminum trialkyl to an alumoxane having a high degree of oligomerization. In accordance with this invention the desired degree of oligomerization is obtained by the order of addition of reactants as described hereinafter.

The metallocene may be any of the organometallic coordination compounds obtained as a cyclopentadienyl derivative of a transition metal. Metallocenes which are useful for preparing an active catalytic complex according to the process of this invention are the mono, bi and tri cyclopentadienyl or substituted cyclopentadienyl metal compounds and most preferably, bicyclopentadienyl compounds. The metallocenes particularly useful in this invention are represented by the general formulas:

$$(Cp)_m MR_n X_q \qquad \text{I.}$$

wherein Cp is a cyclopentadienyl ring, M is a Group 4b or 5b transition metal and preferably a Group 4b transition metal, R is a hydrocarbyl group or hydrocarboxy group having from 1 to 20 carbon atoms, X is a halogen, and m is a whole number from 1 to 3, n is a whole number form 0 to 3, and q is a whole number from 0 to 3, $$(C_5 R'_k)_g R''_s (C_5 R'_k) MQ_{3-g}, \text{ and} \qquad \text{II.}$$

$$R''_s (C_5 R'_k)_2 MQ' \qquad \text{III.}$$

wherein $(C_5 R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4$-$C_6$ ring, R" is $C_1$-$C_4$ alkylene radical, a dialkyl germanium or silicone, or an alkyl phosphine or amine radical bridging two $(C_5 R'_k)$ rings, Q is a hydrocarbyl radical such as aryl, alkyl, alkenyl, alkylaryl, or arylalkyl having 1-20 carbon atoms, hydrocarboxy radical having 1-20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals is methylidene, ethylidene and propylidene.

Of the metallocenes, zirconocenes and titanocenes are most preferred. Illustrative but non-limiting examples of these metallocenes which can be usefully employed in accordance with this invention are monocyclopentadienyl titanocenes such as, cyclopentadienyl titanium trichloride, pentamethylcyclopentadienyl titanium trichloride; bis(cyclopentadienyl) titanium diphenyl; the carbene represented by the formula $Cp_2Ti=CH_2 \cdot Al(CH_3)_2Cl$ and derivatives of this reagent such as $Cp_2Ti=CH_2 \cdot Al(CH_3)_3$, $(Cp_2TiCH_2)_2$, $$Cp_2 \overline{TiCH_2CH(CH_3)CH_2},$$

$Cp_2Ti=CHCH_2CH_2$, $Cp_2Ti=CH_2 \cdot AlR'''_2Cl$, wherein Cp is a cyclopentadienyl or substituted cylopentadienyl radical, and R''' is an alkyl, aryl, or alkylaryl radical having from 1-18 carbon atoms; substituted bis(Cp-)Ti(IV) compounds such as bis(indenyl)Ti diphenyl or dichloride, bis(methylcyclopentadienyl)Ti diphenyl or dihalides and other dihalide complexes; dialkyl, trialkyl, tetra-alkyl and penta-alkyl cyclopentadienyl titanium compounds such as bis(1,2-dimethylcyclopentadienyl)Ti diphenyl or dichloride, bis(1,2-diethylcyclopentadienyl)Ti diphenyl or dichloride and other dihalide complexes; silicone, phosphine, amine or carbon bridged cyclopentadiene complexes, such as dimethyl silyldicyclopentadienyl titanium diphenyl or dichloride, methylenedicyclopentadienyl titanium diphenyl or dichloride and other dihalide complexes and the like.

Illustrative but non-limiting examples of the zirconocenes which can be usefully employed in accordance with this invention are, cyclopentadienyl zirconium trichloride, pentamethylcyclopentadienyl zirconium trichloride, bis(cyclopentadienyl)zirconium diphenyl, bis(cyclopentadienyl)zirconium dichloride, the alkyl substituted cyclopentadienes, such as bis(ethyl cyclopentadienyl)zirconium dimethyl, bis($\beta$-phenylpropylcyclopentadienyl)zirconium dimethyl, bis(methylcyclopentadienyl)zirconium dimethyl, and dihalide complexes of the above; di-alkyl, tri-alkyl, tetra-alkyl, and penta-alkyl cyclopentadienes, such as bis(pentamethylcyclopentadienyl)zirconium dimethyl, bis(1,2-dimethylcyclopentadienyl)zirconium dimethyl, bis(1,3-diethylcyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae $Cp_2Zr=CH_2P(C_6H_5)_2CH_3$, and derivatives of these compounds such as $Cp_2ZrCH_2CH(CH_3)CH_2$.

Bis(cyclopentadienyl)hafnium dichloride, bis(cyclopentadienyl)hafnium dimethyl, bis(cyclopentadienyl)vanadium dichloride and the like are illustrative of other metallocenes.

Generally the use of a metallocene which comprises a bis(substituted cyclopentadienyl) zirconium will provide a catalyst complex of higher activity than a corresponding titanocene or a mono cyclopentadienyl metal compound. Hence bis(substituted cyclopentadienyl) zirconium compounds are preferred for use as the metallocene.

Heretofore the alumoxane component of the active catalyst complex has been separately prepared then added as such to a catalyst support material which is then treated with a metallocene to form the active catalyst complex. One procedure heretofore employed for preparing the alumoxane separately is that of contacting water in the form of a moist solvent with a solution of aluminum trialkyl in a suitable organic solvent such as benzene or aliphatic hydrocarbon. As before noted this procedure is attendant with fire and explosion hazards which requires the use of explosion-proof equipment and carefully controlled reaction conditions. In an alternative method heretofore employed for the separate production of alumoxane, an aluminum alkyl is contacted with a hydrated salt, such as hydrated copper sulfate. The method comprised treating a dilute solution of aluminum alkyl in, for example, toluene, with a copper sulfate pentahydrate. A slow, controlled hydrolysis of the aluminum alkyl to alumoxane results which substantially eliminates the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Correspondingly, the use of a separately produced alumoxane greatly increases the cost of producing a metallocene alumoxane catalyst.

In accordance with the present invention the alumoxane component of the catalyst complex is prepared by direct reaction of an aluminum trialkyl with the material utilized as the catalyst support, namely a water-impregnated silica gel. Silica useful as the catalyst support is that which has a surface area in the range of about 10 to about 700 m²/g, preferably about 100–500 and desirably about 200–400 m²/g, a pore volume of about 3 to about 0.5 cc/g and preferably 2–1 cc/g, and an adsorbed water content of from about 10 to about 50 weight percent, preferably from about 20 to about 40 weight percent, and most preferably about 35 weight percent. The particle size of the silica should be from about $10\mu$ to about $100\mu$, and preferably from about $30\mu$ to about $60\mu$ ($1\mu = 10^{-6}$ m). Hereafter, silica having the above identified properties is referred to as water-impregnated silica gel.

Water-impregnated silica gel may be formed by adding sufficient water to commercially available silica gel (Davidson 948) to create an aqueous slurry. Because silica gel possesses many fine pores, it is extremely adsorbent and will rapidly become saturated. Once the aqueous slurry is formed, excess water can be removed by filtration, followed by air drying, or only air drying, to a free flowing powder state. Drying at elevated temperatures is not recommended because it could substantially decrease the amount of adsorbed water.

Water-impregnated silica gel, as defined above, is added over time, about a few minutes, to a stirred solution of aluminum trialkyl, preferably trimethyl aluminum or triethyl aluminum, in an amount sufficient to provide a mole ratio of aluminum trialkyl to water of from about 10:1 to 1:1, preferably about 5:1 to 1:1. The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like. Also suitable for use as the aluminum trialkyl are tripropyl aluminum, tri-n-butyl aluminum tri-isobutyl aluminum, tri(2-methylpentyl) aluminum, trihexyl aluminum, tri-n-octyl aluminum, and tri-n-decyl aluminum.

Upon addition of the water-impregnated silica gel to the solution of aluminum trialkyl, the water content of the silica gel controllably reacts with the aluminum trialkyl to produce an alumoxane which is deposited onto the surface of the silica gel particles. Although the reaction of the aluminum trialkyl with the water content of the silica gel proceeds relatively quickly, that is, it is generally completed within the time of about 5 minutes, it does not occur with the explosive quickness of that which occurs with free water. The reaction may be safely conducted in conventional mixing equipment under a mantle of inert gas.

Thereafter a metallocene is added to the stirred suspension of alumoxane silica gel product in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 1 minute to about 10 minutes at ambient or an elevated temperature of about 85° C. to permit the metallocene to undergo complete complexing reaction with the adsorbed alumoxane.

For a continuous polymerization process in liquid medium, it is important to minimize the reactor fouling in order to minimize the interruption of the operation. The major source of reactor fouling is the formation of polymer on the surface of process equipment such as reactor vessel, agitator, and transfer lines. The cause of polymer formation on equipment surface is mainly due to the very fine catalyst particles. These fine particles are attracted on the equipment surfaces due to the static charge. The attracted catalyst particles catalyze the formation of polymer on the equipment surface. In order to minimize the reactor fouling, it is important to minimize the formation of very fine catalyst particles in the reactor. One effective approach of minimizing the formation of very fine catalyst particles in a liquid medium is to attach the catalyst on a support material. It was observed that the catalyst formed by reacting aluminum trialkyl with water in liquid hydrocarbon followed by metallocene can cause severe reactor fouling. This reactor fouling can be minimized by using the supported catalyst developed in this invention.

The order of addition between the water-impregnated silica gel and the aluminum trialkyl is important with regards to the activity of the supported catalyst which results upon addition of the metallocene. A supported catalyst composition of little or no activity results when an aluminum trialkyl is added to a stirred solvent suspension of water-impregnated silica gel. It has been found that to prepare a supported catalyst composition of acceptable or high activity the order of mixing must be one wherein the water-impregnated silica gel is added to a stirred solution of the aluminum trialkyl. It is believed that this order of mixing forces the aluminum trialkyl to undergo reaction in the context of a transient localized excess of aluminum trialkyl compared to a transient localized deficiency of water. Under a mixing condition which slowly adds water-impregnated silica gel to a stirred solution of aluminum trialkyl, the bulk content of the aluminum trialkyl converts to an alumoxane with a degree of oligomerization of about 6–25 (y=6–25). Production of an alumoxane with this degree of oligomerization results in a final metallocene alumoxane catalyst complex of useful or high activity. A reverse order of mixing, that is, addition of an aluminum trialkyl to a stirred solvent suspension of water-impregnated silica gel yields a catalyst which has a poor degree of catalytic activity.

In addition to the importance of proper mixing order in achieving a supported catalyst of useful activity, it has also been observed that the water content of the water-impregnated silica gel influences final catalyst activity. Hence the water-impregnated silica gel should have an adsorbed water content of from about 10 to about 50 weight percent. Preferably the adsorbed water content should be from about 20 to about 40 weight percent. Maximum catalyst activity for a given metallocene component is generally observed wherein the adsorbed water content of the water-impregnated silica gel used as a support is about 35 weight percent.

Further influencing the degree of activity attained in the final supported catalyst complex is the mole ratio of aluminum trialkyl to the adsorbed water content of the water-impregnated silica gel. The quantities of aluminum trialkyl employed should, in comparison to the quantity of water-impregnated silica gel of specified adsorbed water content, be selected to provide a mole ratio of aluminum trialkyl to water of from about 10:1 to about 1:1, preferably from about 5:1 to about 1:1, more preferably from about 3:1 to about 1:1. It has been observed that for a given metallocene, a maximum catalyst activity is generally observed in the aluminum trialkyl to water mole ratio range of about 5:1 to about 1:1. Depending upon the particular aluminum trialkyl selected for use, commercially acceptable catalyst activities are exhibited in the aluminum trialkyl to water mole ratio range of about 3:1 to about 1:1.

Also influencing the cost of production and the level of catalytic activity obtained in the final supported catalyst complex is the mole ratio of aluminum to transition metal of the metallocene component. The quantity of metallocene added to the alumoxane adsorbed silica gel solids should be selected to provide an aluminum to transition metal mole ratio of from about 1000:1 to about 1:1, preferably from about 300:1 to about 10:1, and most preferably from about 150:1 to about 30:1. From the standpoint of economic considerations it is desirable to operate in the lower ranges of the aluminum to transition metal mole ratio in order to minimize the cost of catalyst production. The procedure of this invention is one which provides the maximum conversion of the aluminum trialkyl component to the most efficacious form of alumoxane, hence permits the safe production of a supported metallocene alumoxane catalyst of useful activity with low quantities of the costly aluminum trialkyl component.

By appropriate selection of the type and relative amounts of the metallocene and the aluminum trialkyl cocatalyst precursor, one can attain by the present method the particular active catalyst complex desired for any particular application. For example, higher concentrations of alumoxane in the catalyst system generally result in higher molecular weight polymer product. Therefore, when it is desired to produce a high molecular weight polymer a higher concentration of aluminum trialkyl is used, relative to the metallocene, than when it is desired to produce a lower molecular weight material. For most applications the ratio of aluminum in the aluminum trialkyl to total metal in the metallocene can be in the range of from about 300:1 to about 20:1, and preferably about 200:1 to about 50:1.

The molecular weight of the polymer product can be controlled by the judicious selection of substituents on the cyclopentadienyl ring and use of ligands for the metallocene. Further, the comonomer content can be controlled by the judicious selection of the metallocene. Hence, by the selection of catalyst components it is possible to tailor the polymer product with respect to molecular weight and density. Further, one may tailor the polymerization reaction conditions over a wide range of conditions for the production of polymers having particular properties.

In the examples following, the melt index (MI) and melt index ratio (MIR) were determined in accordance with ASTM test D1238.

EXAMPLE 1

Water-impregnated silica gel was employed in accordance with the procedure of this invention to prepare a silica gel supported (nBuCp)$_2$ZrCl$_2$ methyl alumoxane catalyst complex which was used in a slurry phase polymerization process as follows:

One hundred (100) grams of silica gel (Davison 948) was treated with enough water to form a slurry mixture. This slurry was air dried at room temperature to a free flowing state to form water-impregnated silica gel. The water content of this material measured by weight loss on ignition at 1000° C. was 37 wt.%.

A freshly cleaned 2.2 liter autoclave was heated to 60° C. and flushed with purified N$_2$ for 30 minutes. It was cooled to room temperature, and eight hundred (800) milliliters of dried, oxygen free hexane was charged into the autoclave followed by the addition of five (5) milliliters of trimethylaluminum/heptane solution (2.62 M). The autoclave was heated to 85° C., and one hundred thirty (130) milligrams of water-impregnated Davison 948 silica gel was injected into the autoclave using a dry injection tube. The resulting mixture was allowed to react for five (5) minutes. One (1) milligram of (n-C$_4$H$_9$C$_5$H$_4$)$_2$ZrCl$_2$ dissolved in one (1) milliliter toluene was injected into the autoclave to form the catalyst in situ. One hundred (100) milliliters of butene-1 was pushed into the reactor by ethylene pressure, and the reactor was pressurized to 150 psi with ethylene. The reaction was allowed to proceed for 20 minutes, and it yielded 39 grams of resin with 2.8 MI and 20.1 MIR and a density of 0.936.

EXAMPLE 2

The catalyst was prepared in the same manner as the catalyst in Example 1 except that ten (10) milliliters of trimethylaluminum/heptane solution were used during the co-catalyst preparation. Polymerization of ethylene and 1-butene was performed as in Example 1. After the reaction, 49 grams of resin was recovered with 1.7 MI and 20.8 MIR and a density of 0.937.

EXAMPLE 3

The catalyst was prepared in the same manner as the catalyst in Example 1 except that fifteen (15) milliliters of trimethylaluminum/heptane solution were used during the co-catalyst preparation. Polymerization of ethylene and 1-butene was performed as Example 1. The reaction lasted 40 minutes yielding 46 grams of resin with 5.4 MI and 24.8 MIR and a density of 0.945.

EXAMPLE 4

The catalyst was prepared using the same quantities of ingredients as in Example 1. However, the wet silica was first contacted with the metallocene, dried to a free flowing solid (silica contained 37 wt. % water) and thereafter contacted with TMA. On polymerizing in the manner of Example 1, one (1) gram of resin was recovered.

EXAMPLE 5

Example 4 was repeated identically with the exception that fifteen (15) milliliters of TMA/heptane solution were used during the co-catalyst preparation. Upon polymerization in the manner of Example 1, two grams of resin were recovered.

EXAMPLE 6

Example 2 was repeated with the exception that one (1) milligram of (C$_5$H$_5$)$_2$ZrCl$_2$ dissolved in one (1) milliliter of toluene was used during the catalyst preparation. After 40 minutes of polymerization, forty-five (45) grams of resin were recovered. The resin manifested an MI of 9.1 and an MIR of 28.5.

EXAMPLE 7

Example 2 was repeated with the exception that bis(cyclopentadienyl)titanium dichloride was substituted for the zirconocene. After 20 minutes of polymerization, two grams of resin were recovered.

EXAMPLE 8

The catalyst was prepared in the same manner as Example 2 with the exception that one-hundred thirty (130) milligrams of Al(OH)$_3$ with a water content of 39 wt. % were substituted for the silica. The polymerization resulted in forty-one (41) grams of resin being recovered with an MI of 1.0 and an MIR of 18.4.

EXAMPLE 9

Example 8 was repeated with the exception that five (5) milliliters of trimethyl aluminum/heptane solution were employed in the catalyst preparation. The polymerization resulted in forty-one (41) grams being recovered with an MI of 0.9 and an MIR of 22.7.

EXAMPLE 10

A catalyst was prepared in the same manner as in Example 2 with the exception that one-hundred thirty (130) milligrams of Mg(OH)$_2$ with a water content of 31 wt. % were substituted for the silica. After 40 minutes of polymerization, six (6) grams of resin were recovered.

EXAMPLE 11

A catalyst was prepared in the same manner as Example 10 with the exception that five (5) milliliters of trimethyl aluminum/heptane solution were used during the catalyst preparation. After polymerization, one (1) gram of resin was recovered.

EXAMPLE 12

A catalyst was prepared in the same manner as in Example 1 with the exception that ten (10) milliliters of triethyl aluminum/heptane solution were used during the catalyst preparation. After polymerization in the manner of Example 1, one (1) gram of resin was recovered.

EXAMPLE 13

A catalyst was prepared in the same manner as in Example 12 with the exception that five (5) milliliters of triethyl aluminum/heptane solution were employed for the catalyst preparation. Upon polymerization in the same manner as Example 12, one (1) gram of resin was recovered.

Table I summarizes the result obtained in the preceding examples:

TABLE I

| | | Polymerization Data | | |
|---|---|---|---|---|
| Example | Metallocene/AlR$_3$ (ml) | Support | Yield gm/hr | MI (dg/min) | MIR |
| 1 | Zr/TMA (5) | SiO$_2$ | 117 | 2.8 | 20.1 |
| 2 | Zr/TMA (10) | SiO$_2$ | 147 | 1.7 | 20.8 |
| 3 | Zr/TMA (15) | SiO$_2$ | 69 | 5.4 | 24.8 |
| 4 | TMA (5) | Zr/SiO$_2$ | 1 | — | — |
| 5 | TMA (15) | Zr/SiO$_2$ | 3 | — | — |
| 6 | Zr*/TMA (10) | SiO$_2$ | 67 | 9.1 | 28.5 |
| 7 | Ti/TMA (10) | SiO$_2$ | 3 | — | — |
| 8 | Zr/TMA (10) | Al(OH)$_3$ | 61 | 1.0 | 18.4 |
| 9 | Zr/TMA (5) | Al(OH)$_3$ | 61 | 0.9 | 22.7 |
| 10 | Zr/TMA (10) | Mg(OH)$_2$ | 9 | — | — |
| 11 | Zr/TMA (5) | SiO$_2$ | 1 | — | — |
| 12 | Zr/TEAL (10) | SiO$_2$ | 1 | — | — |
| 13 | Zr/TEAL (5) | SiO$_2$ | 117 | 2.8 | 20.1 |

Zr = (n-BuCp)$_2$ZrCl$_2$. Zr* = Cp$_2$ZrCl$_2$, Ti = Cp$_2$TiCl$_2$.
Conditions: 800 ml hexane, 100 ml butene-1, 85° C., 150 psig total pressure, 130 mg support.

The invention has been described with reference to its preferred embodiments. From this description, a person of ordinary skill in the art may appreciate changes that could be made in the invention which do not depart from the scope and spirit of the invention as described above and claimed hereafter.

I claim:

1. A supported metallocene alumoxane catalyst for polymerization of olefins made by the process comprising the steps of:
   (a) adding a water-impregnated catalyst support to a stirred solution of an aluminum trialkyl in an amount sufficient to provide a mole ratio of aluminum trialkyl to water of from about 10:1 to about 1:1 and allowing the mixture to react; and
   (b) adding a metallocene to the reacted mixture in an amount sufficient to provide a mole ratio of aluminum to transition metal of from about 1000:1 to about 1:1.

2. The supported catalyst of claim 1 wherein the catalyst support is silica gel.

3. The supported catalyst of claim 1, wherein the metallocene is represented by the general formula:

$$(Cp)_m MR_n X_q$$

wherein Cp is a cyclopentadienyl ring, M is a Group 4b or 5b transition metal, R is a hydrocarbyl group or hydrocarboxy group having from 1 to 20 carbon atoms, X is a halogen, m is a whole number from 1 to 3 and n and q are whole numbers from 0 to 3.

4. The supported catalyst of claim 1 wherein the metallocene is represented by the general formula:

$$(C_5R'_k)_g R''_s (C_5R'_k) MQ_{3-g}$$

wherein (C$_5$R'$_k$) is a cyclopentadienyl or substituted cyclopentadienyl, each R' is the same or different and is hydrogen or a hydrocarbyl radical containing from 1 to 20 carbon atoms, a silicon-containing hydrocarbyl radical, or a hydrocarbyl radical wherein two carbon atoms are joined together to form a C$_4$-C$_6$ ring, R'' is C$_1$-C$_4$ alkylene radical, a dialkyl germanium or silicone, or an alkyl phosphine or amine radical bridging two (C$_5$R'$_k$) rings, Q is a hydrocarbyl radical having 1-20 carbon atoms, hydrocarboxy radical having 1-20 carbon atoms or halogen and can be the same or different, Q' is an alkylidene radical having from 1 to about 20 carbon atoms, s is 0 or 1, g is 0, 1 or 2, s is 0 when g is 0, k is 4 when s is 1, k is 5 when s is 0, and M is a Group 4b or 5b transition metal.

5. The supported catalyst of claim 1 wherein the metallocene is represented by the general formula:

$$R''_s (C_5R'_k)_2 MQ'$$

wherein (C$_5$R'$_k$) is a cyclopentadienyl or substituted cyclopentadienyl, each R' is the same or different and is hydrogen or a hydrocarbyl radical containing from 1 to 20 carbon atoms, a silicon-containing hydrocarbyl radical, or a hydrocarbyl radical wherein two carbon atoms are joined together to form a $C_4$-$C_6$ ring, R'' is $C_1$-$C_4$ alkylene radical, a dialkyl germanium or silicone, or an alkyl phosphine or amine radical bridging two ($C_5R'_k$) rings, Q is a hydrocarbyl radical having 1-20 carbon atoms, hydrocarboxy radical having 1-20 carbon atoms or halogen and can be the same or different, Q' is an alkylidene radical having from 1 to about 20 carbon atoms, s is 0 or 1, k is 4 when s is 1, k is 5 when s is 0, and M is a Group 4b or 5b transition metal.

6. The supported catalyst of claim 1 wherein the metallocene is selected from the group consisting of zirconocenes, titanocenes, hafnocenes and vanadocenes.

7. The supported catalyst of claim 1 wherein the mole ratio of aluminum trialkyl to water is from about 5:1 to 1:1.

8. The supported catalyst of claim 1 wherein the mole ratio of aluminum to transition metal is from about 300:1 to about 10:1.

9. The supported catalyst of claim 1 wherein the mole ratio of aluminum to transition metal is from about 150:1 to about 30:1.

10. The supported catalyst of claim 1 wherein the aluminum trialkyl is selected from the group consisting of trimethyl aluminum, triethyl aluminum, tripropyl aluminum, tri-n-butyl aluminum, tri-isobutyl aluminum, tri(2-methylpentyl) aluminum, trihexyl aluminum, tri-n-octyl aluminum, and tri-n-decyl aluminum.

* * * * *